June 15, 1937.　　A. E. SCHUBERT　　2,083,670
LENS CAP AND FINDER ARRANGEMENT FOR MOTION PICTURE APPARATUS Filed May 31, 1935

INVENTOR.
Alvin E. Schubert
BY
ATTORNEYS

Patented June 15, 1937

2,083,670

UNITED STATES PATENT OFFICE 2,083,670

LENS CAP AND FINDER ARRANGEMENT FOR MOTION PICTURE APPARATUS

Alvin E. Schubert, Rochester, N. Y., assignor, by mesne assignments, to Eastman Kodak Company, Jersey City, N. J., a corporation of New Jersey Application May 31, 1935, Serial No. 24,262

4 Claims. (Cl. 88—1.5)

The present invention relates to a lens cap for covering the objective of a motion picture apparatus and which alternatively functions to block one element of the finder system in an operative position.

Motion picture apparatus which are driven by electric motors cannot readily be provided with release members to stop the shutter and film advancing mechanism in a predetermined position. Consequently, such apparatus stops in different positions depending upon the time in which the inertia and momentum within the apparatus are dissipated. Therefore, it often happens that an electric motor driven apparatus comes to a stop with the shutter in open position. As a result, the film at the gate is fogged and if the condition exists for sufficient time the film in the interior of the apparatus may also become fogged.

This objectionable fogging of the film may be overcome by providing a lens cap for the objective. The lens cap will not be placed over the objective immediately to prevent fogging the frame at the exposure aperture but if said lens cap is placed over the objective with reasonable promptness the secondary fogging of the film within the apparatus does not occur. However, forgetfulness on the part of the operator may result in either operating the apparatus with the lens cap still on the objective or in neglecting to cap the objective after use of the camera has been discontinued.

The primary object of the present invention is the provision of a cap member for the objective of the apparatus and which may also be placed in position to hold a finder element in operative position, the finder element being biased or normally moved to an inoperative position.

Another object of the invention is the provision of a support for supporting a cap member to hold a finder element in operative position, which cap member can only be mounted upon the support when the finder element is in operative position.

A further object of the invention is the provision of a support which can support a cap member as just described but which permits movement of the finder element to an inoperative position which is closely adjacent to the casing of the apparatus.

Still another object of the invention is the provision of a soft lining on the interior of the cap member so as to provide adequate frictional engagement with the objective of the apparatus or with the support for mounting the cap member to block the finder element in operative position.

Other and further objects of the invention will be suggested to those skilled in the art by the following description.

The above and other objects of the invention are embodied in a construction which includes a finder system on a motion picture apparatus, one element of the finder being resiliently or otherwise urged into an inoperative position to lie along the casing of the apparatus, and a support member adapted to support a lens cap member so as to engage the aforementioned finder element and hold the same in operative position. The cap member and support are so arranged that the cap member cannot be fitted onto the support until the finder element has been moved to operative position.

By means of the forementioned arrangement the finder system for the apparatus is not readily placed in operative condition until the lens cap has been removed from the objective and mounted on the support adjacent the finder element to hold it in proper position, nor can the finder element be folded to inoperative position for convenient transportation of the apparatus until the cap member has been removed from the support. After removal of the cap member support, it is most convenient to fit the cap member onto the objective to prevent fogging of the film in the apparatus.

Reference is hereby made to the accompanying drawing wherein similar reference characters designate similar elements and wherein.

Figure 1:
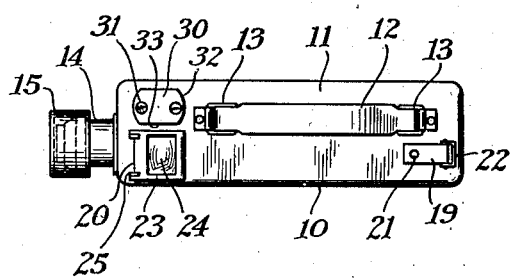
Fig. 1 is a plan view of a motion picture camera equipped with a lens cap and finder arrangement with the finder elements in inoperative position.

The invention will be described herein with respect to a motion picture camera but it is to be understood that the invention may also be applied to other types of motion picture apparatus including a finder system and requiring a cap member for the objective.

In the illustrated embodiment of the invention, the camera comprises a casing 10 having at least one flat wall 11. A handle 12 may be attached to wall 11 by means of a pair of connections 13.

An objective 14 is mounted on the front of camera casing 10 and is cylindrical in form according to the customary design for objectives.

Figure 5:
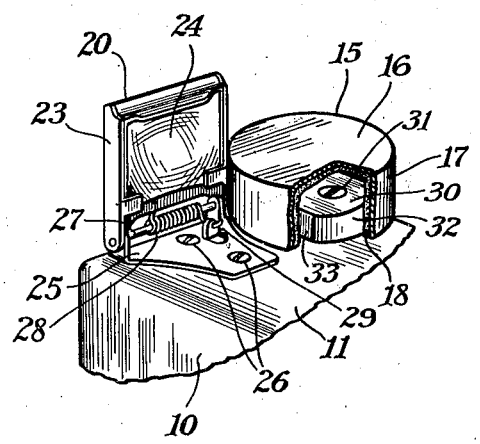
Fig. 5 is a fragmentary perspective view of the finder element held in upright or operative position by the lens cap member mounted on the support.

A cap member 15 is also preferably of cylindrical formation and includes a top 16 and a peripheral wall 17, see Fig. 5. The cap member 15 may be provided throughout with a soft lining 18 composed of plush or other similar material. The lining 18 for the cap member 15 insures a light-tight capping of the objective and creates a good frictional engagement between the wall 17 of the cap and exterior of the objective 14. Lens caps of this type for objectives are well known in the art.

Figure 3:
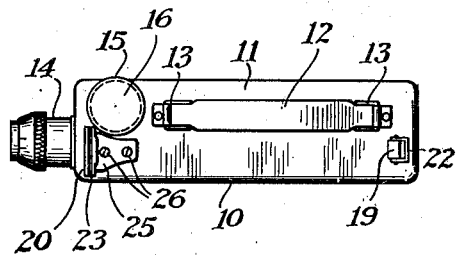
Fig. 3 is a plan view of the camera with the finder elements in operative position and with one of said finder elements being engaged and maintained in such position by the cap member for the objective.
Figure 4:
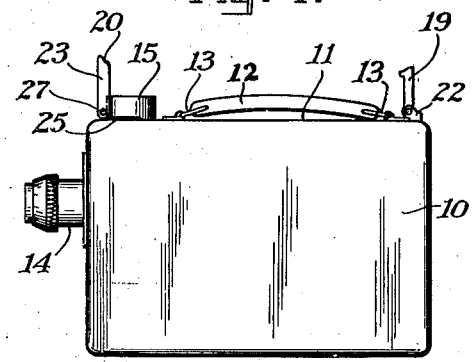
Fig. 4 is a side elevation of the camera with the finder elements in operative position.

The finder system for the camera comprises a rear sight 19 and a finder element 20. The rear sight 19 is provided with a hole 21, see Fig. 1, and is mounted at the rear of the camera by a bracket 22 which permits folding of the sight 19 to inoperative position, see Figs. 1 and 2 and which permits the erection of the rear sight 19 to the operative position illustrated in Figs. 3 and 4. The finder element 20 comprises a frame 23 in which a lens 24 is mounted, a bracket 25 fastened to the flat wall 11 of casing 10 by a pair of screws 26, and a pin 27 for pivotally connecting said frame 23 to bracket 25. The finder element 20 is biased or normally urged to an inoperative, folded or flat position, see Figs. 1, 2 and 6 by a resilient means such as a coil spring 28 which encircles pin 27, has one end anchored in frame 23 and has the other end fastened to a lug 29 stamped from the material of bracket 25, see Fig. 5. Thus normally finder element 20 is maintained by the resilient means or coil spring 28 in the position shown in Fig. 6.

A support 30 is fastened to flat wall 11 of casing 10 by bolts 31. The support 30 is adapted to support the cap member 15, having circular ends 32 for frictional engagement with the soft lining 18 of cap member 15. Support 30 is so located on wall 11 that the cap member 15, when fitted over support 30, engages one edge of frame 23 of finder element 20 to maintain said finder element 20 in an upright or operative position in spite of the normal tendency of coil spring 28 to move finder element 20 to inoperative position. It will be noted that cap member 15 engages finder element 20 to hold the same upright without obstructing or intercepting the field defined by the finder system.

The location of support 30 to perform the function just described requires that the same be quite close to finder element 20. However, support 30 should not prevent movement of finder element 20 under the control of spring 28 to a position closely adjacent to the flat wall 11. To permit finder element 20 to lie flat along wall 11, the support 30 is provided with a flat or straight side 33 which, as shown in Fig. 6, permits compact folding of finder element 20.

The objective 14 on the apparatus defines a definite field corresponding to the angle and optical characteristics of the lenses within the objective. The finder system including the rear sight 19 and finder element 20 defines a field of view which coincides with the field of the objective 14. Such arrangement of a finder to define the field of an objective is well known.

Figure 2:
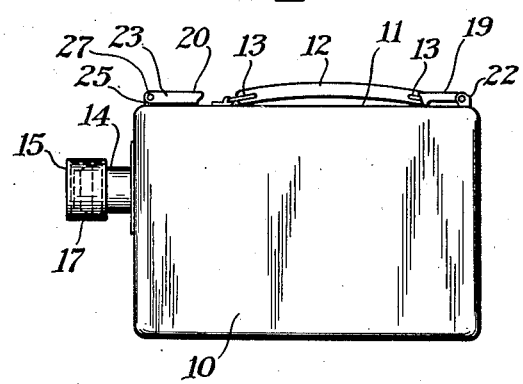
Fig. 2 is a side elevation of the camera also with the finder elements in inoperative position.
Figure 6:
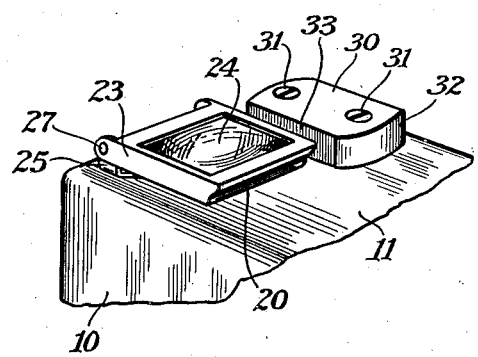
Fig. 6 is a fragmentary perspective view of the finder element and support after the lens cap has been removed, showing the finder element in biased or normal position closely adjacent to the casing of the camera.

The apparatus, during transportation or when not in use, will have the cap member 15 covering objective 14 and finder elements 19 and 20 will be in the inoperative or folded positions shown in Figs. 1, 2 and 6. When it is desired to operate the apparatus, the field of the objective cannot be determined without first erecting both elements of the finder system. Rear sight 19 may be manually erected and will remain in upright position. However, the finder system is not completely operative until finder element 20 has also been erected. The resilient means or spring 28 will not permit location of finder element 20 in an operative position without being held or blocked in such position. According to the invention the most convenient manner of so blocking finder element 20 is provided by fitting lens cap 15 onto support 30. Obviously, the lens cap must first be removed from the objective 14 necessarily to prepare the apparatus for proper operation.

As before noted the lens cap 15, when in position to block the finder element 20 in upright and operative position, does not interfere with sighting through the finder system.

When it is desired to prepare the apparatus for transportation or storage, the finder elements are folded to closed position. The rear sight 19 can be readily lowered but finder element 20 cannot be lowered until lens cap 15 has been removed from support 30. Upon such removal of lens cap 15 the finder element 20 moves to inoperative position, the flat side 33 of support 30 permitting finder element 20 to lie close to wall 11. With the finder element 20 in inoperative or folded position the cap 15 cannot be fitted onto support 30 and the only other convenient support for it is over the objective 14. Thus the operator is compelled by reasons of convenience to uncover the objective before operating the apparatus and to cover the objective before preparing the apparatus for transportation or storage.

The formation of the lens cap 15 and of the support 30, as well as the location of the support 30, may be varied in different ways and still perform the same functions. The scope of the present invention is defined in the appended claims.

Having now particularly described my invention what I desire to secure by Letters Patent of the United States and what I claim is:

1. A motion picture apparatus, comprising a casing, an objective thereon having a definite field, a finder system mounted on said casing for indicating the field of said objective and including a sighting element which is biased to an inoperative position, a cap member for covering said objective and for alternatively blocking said sighting element in operative position, and a support on said casing for supporting said cap member to block said sighting element in said operative position and located with respect to said sighting element in inoperative position so that said cap member can not be supported by said support.

2. A motion picture apparatus, comprising a casing, an objective thereon having a definite field, a finder system mounted on said casing for indicating the field of said objective and including a front sighting element provided with an opening for indicating the field of said objective and normally in an inoperative position, a cap member for covering said objective and for alternatively blocking said sighting element in operative position, and a support on said casing for supporting said cap member to block said sighting element in said operative position without obstructing the opening therein but located and arranged on said casing so as to permit movement of said sighting element to the normal inoperative position.

3. A motion picture apparatus, comprising a casing, an objective thereon having a definite field, a finder system mounted on said casing for indicating the field of said objective and including a front sighting element provided with an opening for indicating the field of said objective and normally in an inoperative position, a cap member for frictionally engaging and covering said objective and for alternatively blocking said sighting element in operative position, and a support on said casing, onto which said cap member is frictionally fitted to block said sighting element in operative position, and having a flat side to permit movement of said sighting element to normal inoperative position in which position said element prevents fitting of said cap member onto said support.

4. A motion picture apparatus, comprising a casing having at least one flat wall, an objective on said casing and having a definite field, a finder system on said wall of the casing for indicating the field of said objective and including a sighting element pivotally mounted on said wall, a resilient means for normally maintaining said sighting element in folded position along said flat wall, a cylindrical cap member for covering said objective and for alternatively blocking said sighting element in operative position, and a support on said casing having rounded portions for engaging and supporting said cap member in position to block said sighting element in said operative position and having a flat portion which permits said sighting element in said inoperative position to lie closely adjacent to said wall of the casing.

ALVIN E. SCHUBERT.